United States Patent [19]
Furuhashi

[11] Patent Number: 5,296,962
[45] Date of Patent: Mar. 22, 1994

[54] HIGH SENSITIVITY MICROSCOPE

[75] Inventor: Hidehiko Furuhashi, Fujisawa, Japan

[73] Assignee: Nikon Corporation, Tokyo, Japan

[21] Appl. No.: 856,762

[22] Filed: Mar. 24, 1992

[30] Foreign Application Priority Data

Apr. 1, 1991 [JP] Japan ................................ 3-094723

[51] Int. Cl.$^5$ ............................................. G02B 21/06
[52] U.S. Cl. ...................................... 359/388; 359/368; 359/381
[58] Field of Search ...................... 359/385–389, 359/412–435, 663, 362–384; 250/214 VT, 214 LA, 232; 356/32, 218; 313/371, 524, 534

[56] References Cited

U.S. PATENT DOCUMENTS

| | | | |
|---|---|---|---|
| 4,128,340 | 12/1978 | Fender et al. | 356/218 |
| 4,253,726 | 3/1981 | Taira | 359/388 |
| 4,398,788 | 8/1983 | Dietz | 359/412 |
| 4,467,190 | 8/1984 | Hadani | 250/213 VT |
| 4,592,625 | 6/1986 | Uehara et al. | 359/663 |
| 4,641,931 | 2/1987 | Loy | 250/213 VT |

*Primary Examiner*—Scott J. Sugarman
*Assistant Examiner*—Thong Nguyen
*Attorney, Agent, or Firm*—Shapiro and Shapiro

[57] ABSTRACT

A high sensitivity microscope is applicable to observe a dark specimen image or an image of a specimen unsuitable for irradiation by strong illumination light, through the use of an image intensifier capable of being inserted into a viewing optical system. The viewing optical system comprises an objective and an eyepiece, and an image intensifier may be disposed in the viewing optical system such that an acceptance plane thereof is located at an image plane of the objective and such that an optical output plane thereof is conjugate with an image plane of the eyepiece. Also, an optical path switch mechanism may be provided to guide light from the objective selectively through an optical path including the image intensifier or through an optical path not including the image intensifier. Alternatively, the image intensifier or a relay lens may be selectively inserted into the viewing optical system.

6 Claims, 3 Drawing Sheets

HIGH SENSITIVITY MICROSCOPE

BACKGROUND OF THE INVENTION

1. Field of the Invention

The present invention relates to a high sensitivity microscope. More particularly, the invention relates to a technology which enables bright observation of a dark specimen image (for example, a specimen unsuitable for the use of strong illumination light), through the use of an image intensifier which may be introduced into a viewing optical system.

2. Related Background Art

Conventional optical microscopes are constructed such that an objective receives light from a specimen irradiated by an illumination device of the microscope and such that imaging optical flux from the objective is guided to an image plane of an eyepiece.

In conventional optical microscopes, strong illumination light must be used in order to obtain a bright microscopic image. However, there are instances in which strong illumination light does not provide a bright image, as well as instances in which strong illumination light is not appropriate for observing a particular specimen. For example, if a specimen has a slight polarization, requiring a polarization microscopic observation, an observed image would be still be dark even with increased illumination light. As another example, for a specimen such as a cultured cell or microorganism which would die under strong illumination light, weak illumination light must be used. This inconveniently results in a dark image which is difficult to observe. The foregoing problems are notably compounded with increased microscope magnification, because an observation image becomes darker as magnification increases. Also, in the case of a fluorescent microscope using a fluorescent specimen, the use of strong illumination light is problematic in that fluorescent color matter in the specimen becomes faded soon after being subjected to the illumination light.

It is possible to utilize a high sensitivity television camera, such an SIT camera, attached to a microscope to enable viewing of an intensified image of a dark specimen on a television monitor. However, observation is limited on the television monitor, so that the field of view is narrow and the resulting system is undesirably large. It is also inconvenient to use such a monitor because the operator must change his view between a lens barrel of the microscope and the monitor when switching observation modes (ordinary microscopic observation versus television observation).

SUMMARY OF THE INVENTION

An object of the present invention is to provide a high sensitivity microscope enabling bright observation of a dark specimen image without the strong illumination light used in ordinary microscopes.

To achieve the above object, the present invention provides a high sensitivity microscope comprising an objective and an eyepiece as a viewing optical system, and an image intensifier is arranged in the viewing optical system such that its acceptance plane is located on an image plane of the objective and that its optical output plane is conjugate with an image plane of the eyepiece.

Also, the high sensitivity microscope of the present invention may have an optical path switch means to guide light from the objective selectively through an optical path including the image intensifier or through an optical path which does not include the image intensifier.

Furthermore, the high sensitivity microscope of the present invention may be constituted such that the image intensifier or a relay lens may be selectively inserted into the viewing optical system.

In the above arrangements, image light through the objective enters the image intensifier, and the objective image may be formed on the acceptance plane of the image intensifier because the image plane of the objective is located at the acceptance plane. The image intensifier intensifies the image and outputs the intensified image from the optical output plane, such as a fluorescent plane. Since the optical output plane is conjugate with the image plane of the eyepiece, the intensified image on the optical output plane may be observed through the eyepiece. Thus, the microscopic image may be observed through the image intensifier without the use of strong illuminating light, thereby avoiding such problems as danger to a living specimen and fading of a specimen which may be easily faded. Also, a bright observation image may be obtained for an intrinsically dark specimen, as well as at a high magnification.

When the optical path switch means is provided to lead the light from the objective selectively through the optical path including the image intensifier or through the optical path not including the image intensifier, an observation image through the image intensifier has a field of view with almost the same breadth and magnification as the ordinary microscopic image, so that it is possible to switch between the two observation modes to compare the ordinary observation image with the intensified image from the image intensifier. This advantage may also be obtained in the arrangement in which the image intensifier or the relay lens is selectively inserted into the viewing optical system. Using a microphotographic device, a microphotograph may be readily taken with an image of intensified light from the image intensifier.

DESCRIPTION OF THE PREFERRED EMBODIMENTS

Figure 1:
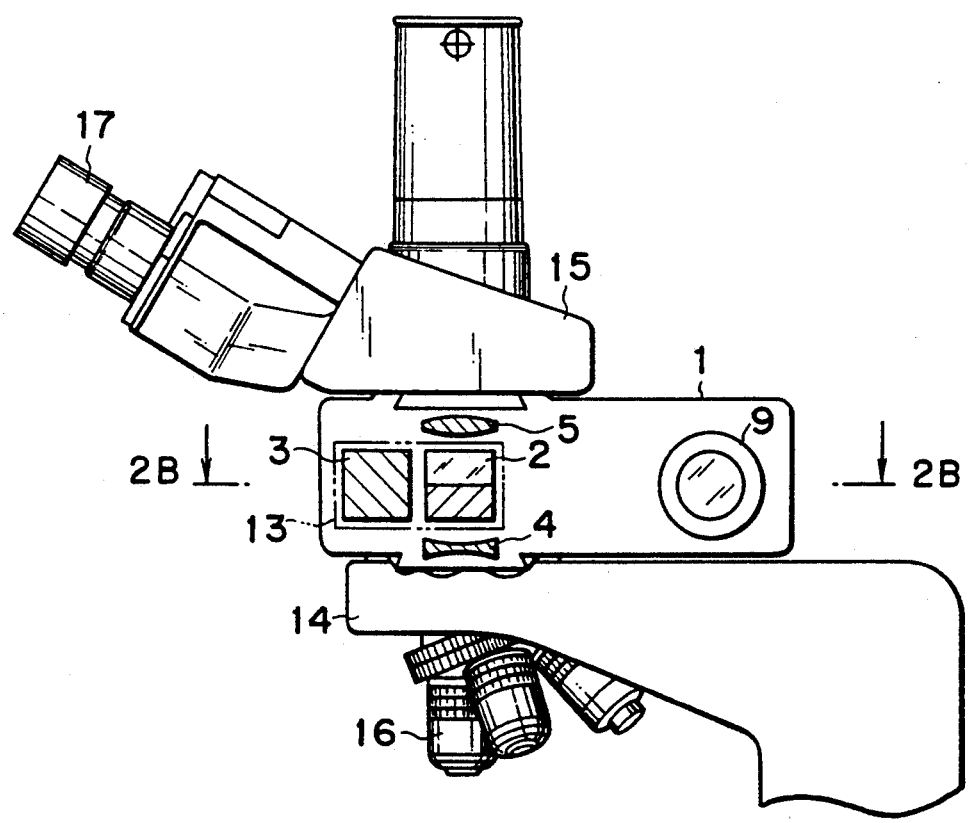
FIG. 1 is a side view, partially in section, showing a structure of a high sensitivity microscope of a preferred embodiment according to the present invention.

FIG. 1 shows a first embodiment of a high sensitivity microscope according to the present invention. The microscope as shown has a microscope mount 14 to which an objective lens 16 is attached, a viewing lens barrel 15 to which an eyepiece 17 is attached, and microscope lens barrel 1 disposed between the microscope mount 14 and the viewing lens barrel 15. The microscope lens barrel 1 includes an image intensifier 9 and an optical path switch mechanism 13 comprising a total reflection prism 2 and a cylindrical glass 3. The optical path switch mechanism 13 selectively inserts the total reflection prism 2 or the cylindrical glass 3 between relay lenses 4, 5 into a viewing optical system from the objective lens 16 through the viewing lens barrel 15 to the eyepiece 17.

Figure 2A:
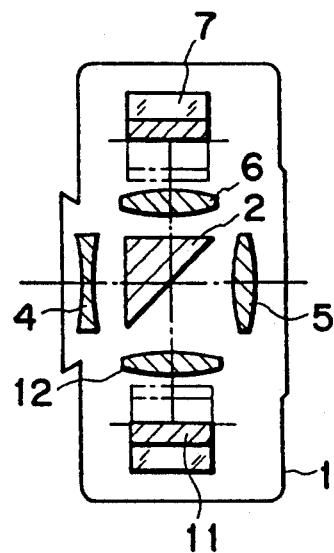
FIGS. 2A and 2B are partly sectional left side and plan views, respectively, showing structural details of a microscope lens barrel including an image intensifier used in the high sensitivity microscope as shown in FIG. 1, FIG. 2B being taken along line 2B—2B in FIG. 1 and FIG. 2A being taken along line 2A—2A in FIG. 2B.
Figure 2B:
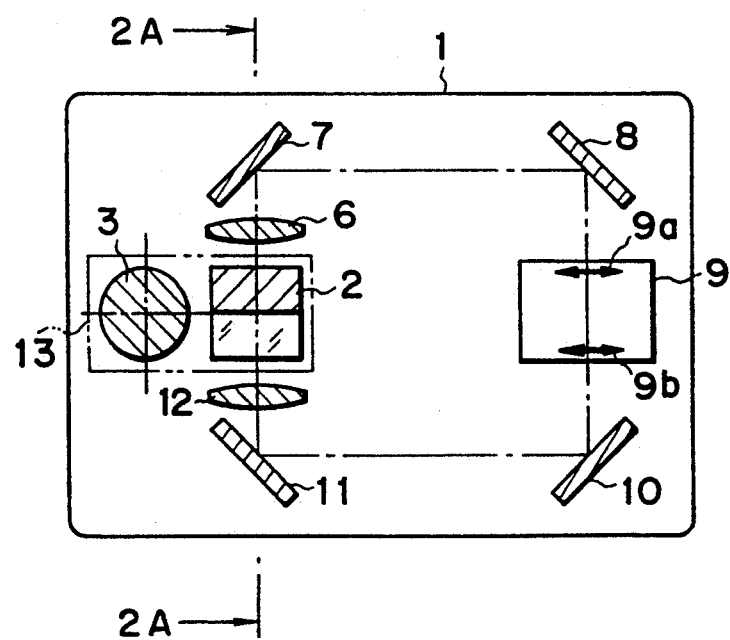
Figure 3:
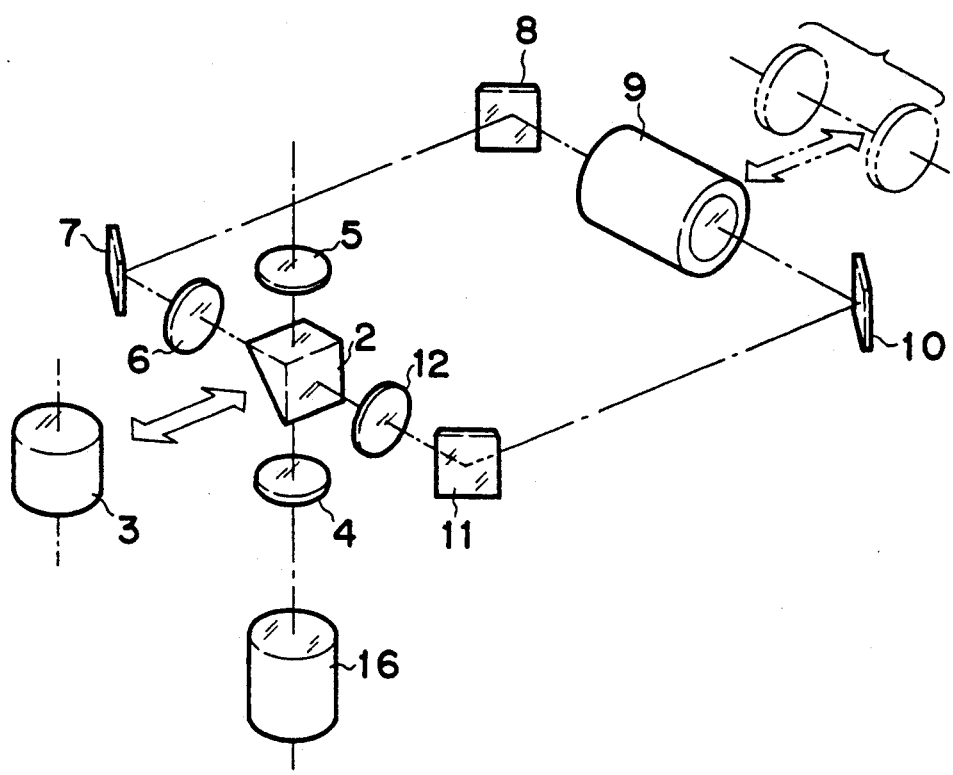
FIG. 3 is a perspective view showing an optical system included in the microscope lens barrel used in the high sensitivity microscope as shown in FIG. 1.

Referring to FIGS. 2A, 2B and 3, the microscope lens barrel 1 has the relay lens 4 facing the objective lens 16 and the other relay lens 5 facing the viewing lens barrel 15. The total reflection prism 2 or the cylindrical glass 3 is selectively inserted between the relay lenses 4 and 5 (on the optical axis, as shown) by the optical path switch mechanism 13. A lens 6 and a reflection mirror 7 are disposed on one side of the total reflection prism 2, and a lens 12 and a reflection mirror 11 on the other side of the prism 2. Additional reflection mirrors 8, 10 are disposed to face the reflection mirrors 7, 11, respectively, and an image intensifier 9 is located in an optical path between the reflection mirrors 8 and 10. The total reflection prism 2 may be substituted by a simple double side reflection mirror, and the respective reflection mirrors 7, 8, 10, 11 by total reflection prisms. If the optical flux is parallel between the relay lenses 4 and 5, the cylindrical glass 3 may be omitted.

When ordinary microscopic observation is conducted without the image intensifier 9 in the high sensitivity microscope as explained, the cylindrical glass 3 is located at the illustrated of the total reflection prism 2, being substituted therefor. The light from the objective lens 16 passes through the relay lens 4, the cylindrical glass, the other relay lens 5, and the viewing lens barrel 15 to be focussed on the image plane of the eyepiece 17.

In contrast, when an image is observed through the image intensifier 9, the total reflection prism 2 is brought into the optical path of the viewing optical system in the microscope as shown. Accordingly, the light from the objective lens 16 passes through the relay lens 4, the total reflection prism 2, the lens 6, and the reflection mirrors 7, 8 to reach a photoelectric plane or acceptance plane of the image intensifier 9, providing an image 9A from the objective lens 16 on the acceptance plane. The image intensifier 9 intensifies the image and outputs an image 9B from the fluorescent plane or output image plane. The image 9B is directed by way of the reflection mirrors 10, 11, the lens 12, the total reflection prism 2, the relay lens 5 and the viewing lens barrel 15 to be focussed on the image plane of the eyepiece 17. It is advantageous that the acceptance plane of image intensifier 9 coincides with the position of a primary image plane of the objective lens 16 and that the optical output plane of the image intensifier 9 is conjugate with the image plane of the eyepiece 17. As described, a microscopic image may be observed by the intensified light through the image intensifier 9.

As an alternative to the above construction, instead of switching the optical path by selective use of the total reflection prism 2 and the cylindrical glass 3, the total refection prism 2 may be permanently set in the optical path, and the image intensifier 9 and a pair of relay lenses may be interchanged for selective use as indicated in phantom in FIG. 3.

Figure 4:
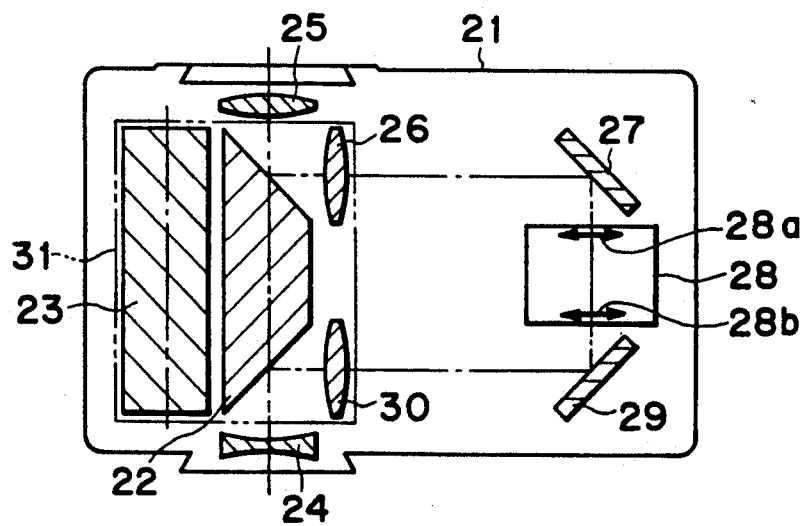
FIG. 4 is partly sectional elevational view showing structure of a lens barrel used in a high sensitivity microscope of another embodiment according to the present invention.

FIG. 4 shows a microscope lens barrel 21 of a second embodiment of the high sensitivity microscope according to the present invention. The microscope lens barrel 21 as shown is structured by vertically arranging the components in the first embodiment shown in FIGS. 1–3. In detail, the microscope lens barrel 21 of FIG. 4 is provided with a trapezoidal total reflection prism 22, a cylindrical glass 23, lenses 26, 30 as an optical path switch mechanism 31, and relay lenses 24, 25, reflection mirrors 27, 29, and an image intensifier 28 located between the reflection mirrors 27 and 29. In such microscope lens barrel 21, relay lenses 24, 25 are arranged to face the lens 16 and the viewing lens barrel 15, respectively.

In the high sensitivity microscope using the microscope lens barrel 21 as shown in FIG. 4, when an ordinary microscopic image is observed without the image intensifier 28, the cylindrical glass 23 is arranged between the relay lenses 24 and 25 by the optical path switch mechanism 31. Then the light from the lens 16 may be observed through the relay lens 24, the cylindrical glass 23, the other relay lens 25, the viewing lens barrel 15, and eyepiece 17.

In contrast, when an image is observed by the intensified light from the image intensifier 28, the total reflection prism 22 is arranged at the position as shown in FIG. 4 or between the relay lenses 24 and 25 by the optical path switch mechanism 31. Then the light from the objective lens 16 passes through the relay lens 24, the total reflection prism 22, the lens 30, and the reflection mirror 29 to be focussed as an image 28B by the objective 16 on a photoelectric plane of the image intensifier 28. The image intensifier 28 intensifies the image and outputs image 28A from a fluorescent plane thereof. The image 28A is led through the reflection mirror 27, the lens 26, the total refection prism 22, and the other relay lens 25 to enter the viewing lens barrel 15, providing an image focussed on the image plane of the eyepiece 17. Thus the microscopic image may be observed after being intensified by the image intensifier 28.

As described, according to the present invention, the image intensifier with an optical amplification function is introduced into the viewing optical system of a microscope, so that a bright observation image may be observed even for a dark specimen or for a specimen unsuitable for use of strong illumination light and therefore requiring weak illumination. Also the microscope may be switched into an ordinary observation mode, without the image intensifier, so that both intensified and non-intensified images may be observed and compared to each other without change of observation posture. Further, photography of microscopic images using the image intensifier may be effected with a shorter exposure time, or at a faster shutter speed. In addition, the image intensifier has a function to intensify and provide a visible output from incident infrared light an ultraviolet light, thus allowing observation with infrared and ultraviolet light, which is not possible with ordinary optical microscopes.

What is claimed is:

1. A high sensitivity microscope comprising:
   a viewing optical system having an objective and an eyepiece;
   an image intensifier capable of being disposed in said viewing optical system such that an acceptance plane thereof is positioned at an image plane of said objective and that an optical output plane thereof is conjugate with an image plane of said eyepiece; and switching means for causing light from said objective to be guided selectively through an optical path passing through said image intensifier and an optical path not passing through said image intensifier.

2. A high sensitivity microscope according to claim 1, including relay lens means selectively interchangeable with said image intensifier in said viewing optical system.

3. A high sensitivity microscope according to claim 1, wherein said optical path not passing through said image intensifier includes relay optical means.

4. A high sensitivity microscope according to claim 3, wherein said switching means includes a reflection optical member selectively insertable into said optical path not passing through said image intensifier, at a position on an optical axis of said relay optical means.

5. A high sensitivity microscope according to claim 4, wherein said relay optical means includes a pair of relay optical members and said position is between said relay optical members.

6. A high sensitivity microscope comprising:
 a viewing optical system having an objective and an eyepiece;
 an image intensifier capable of being disposed in said viewing optical system such that an image of a specimen formed by way of said objective is positioned on an acceptance plane of said image intensifier and output as an intensified image from an output plane of said image intensifier; and
 switching means for causing light from said objective to be guided selectively through an optical path passing through said image intensifier and an optical path not passing through said image intensifier.

* * * * *